(12) United States Patent
Benedetti et al.

(10) Patent No.: US 9,611,878 B2
(45) Date of Patent: Apr. 4, 2017

(54) TETHERED FASTENER

(71) Applicant: Newfrey LLC, Newark, DE (US)

(72) Inventors: Steven Michael Benedetti, Sterling Heights, MI (US); Wayne Robert Boylan, Macomb, MI (US); Grant Gerbasi Garrett, Rochester Hills, MI (US)

(73) Assignee: Newfrey LLC, New Britain, CT (US)

(*) Notice: Subject to any disclaimer, the term of this patent is extended or adjusted under 35 U.S.C. 154(b) by 217 days.

(21) Appl. No.: 14/478,533

(22) Filed: Sep. 5, 2014

(65) Prior Publication Data

US 2016/0069366 A1   Mar. 10, 2016

(51) Int. Cl.
| | | |
|---|---|---|
| *B60R 21/20* | (2011.01) | |
| *F16B 5/06* | (2006.01) | |
| *B60R 13/02* | (2006.01) | |
| *B60R 21/213* | (2011.01) | |
| *B60R 21/216* | (2011.01) | |

(52) U.S. Cl.
CPC .......... *F16B 5/065* (2013.01); *B60R 13/0206* (2013.01); *B60R 21/213* (2013.01); *B60R 21/216* (2013.01)

(58) Field of Classification Search
CPC .............. B60R 13/0206; B60R 21/215; B60R 2021/21506; B60R 21/216; B60R 21/086; B60R 21/2338; B60R 2021/23386; B60R 21/213; F16B 5/0607; F16B 5/0621; F16B 5/065; F16B 5/0657; F16B 21/065; F16B 21/075; F16B 21/082; Y10T 24/307; Y10T 24/31; Y10T 24/314; Y10T 24/316

See application file for complete search history.

(56) References Cited

U.S. PATENT DOCUMENTS

| 1,270,494 A | 6/1918 | Christiansen |
| 2,426,975 A | 9/1947 | Roach |
| (Continued) | | |

FOREIGN PATENT DOCUMENTS

| DE | 19838069 A1 | 3/2000 |
| WO | WO2009/039276 A1 | 3/2009 |
| WO | WO2012/074566 A1 | 6/2012 |

OTHER PUBLICATIONS

Extended European Search Report dated Jan. 14, 2016 in corresponding EP Patent Application No. 15183340.7.

*Primary Examiner* — Jack W Lavinder
(74) *Attorney, Agent, or Firm* — Harness, Dickey & Pierce, PLC

(57) ABSTRACT

A tethered fastener assembly includes a first connector portion, a second connector portion, and a tether portion. The tether portion couples the first connector portion to the second connector portion and includes a first releasable holding feature, a first cooperating releasable holding feature, a second releasable holding feature, and a second cooperating releasable holding feature. The first releasable holding feature is engageable with the first cooperating releasable holding feature. The second releasable holding feature is engageable with the second cooperating releasable holding feature. The first releasable holding feature engages the first cooperating releasable holding feature, and the second releasable holding feature engages the second cooperating releasable holding feature, to retain the tether portion in a folded configuration.

25 Claims, 7 Drawing Sheets

(56) References Cited

U.S. PATENT DOCUMENTS

| | | | |
|---|---|---|---|
| 4,398,317 A | 8/1983 | Schubring | |
| 4,698,882 A | 10/1987 | Lang | |
| 5,467,507 A | 11/1995 | Marsh et al. | |
| 6,394,695 B1 | 5/2002 | Chausset | |
| 6,431,585 B1 | 8/2002 | Rickabus et al. | |
| 7,077,449 B2 | 7/2006 | Tokunaga | |
| 7,155,783 B2 | 1/2007 | Nessel et al. | |
| 7,178,205 B2 | 2/2007 | Nessel et al. | |
| 7,178,850 B2 | 2/2007 | Smith et al. | |
| 7,290,795 B2 | 11/2007 | Kawai et al. | |
| 7,338,068 B2 | 3/2008 | Kawai et al. | |
| 7,454,826 B2 | 11/2008 | Nessel et al. | |
| 7,698,788 B2 | 4/2010 | Hansen et al. | |
| 7,832,064 B2 | 11/2010 | Nessel et al. | |
| 8,046,880 B2 | 11/2011 | Katoh et al. | |
| 8,128,145 B2 * | 3/2012 | Smith | B60R 11/00 296/29 |
| 8,316,514 B2 | 11/2012 | Sano | |
| 8,480,120 B1 | 7/2013 | Fukuda et al. | |
| 8,844,992 B1 | 9/2014 | Noga et al. | |
| 9,056,593 B2 * | 6/2015 | Risdale | B60R 21/216 |
| 2007/0113382 A1 | 5/2007 | Nessel et al. | |
| 2008/0235919 A1 | 10/2008 | Giddings et al. | |

\* cited by examiner

TETHERED FASTENER

FIELD

The present disclosure relates to fasteners used in a vehicle to join, and control the release of, a vehicle component during deployment of an occupant restraint system, and related manufacturing processes.

BACKGROUND

This section provides background information related to the present disclosure and is not necessarily prior art.

Clips and fasteners can be used to retain trim panels and other components (e.g., exterior moldings, mirrors, instrument panels, etc.) relative to a body portion of an automobile or other vehicle. In some instances, a tethered fastener can include a tether that controls the release or disengagement of the trim panel from the body portion. For example, in the event an air bag or other occupant restraint system is deployed, the trim panel can disengage from the body portion. The tethered fastener can help to control the movement of the trim panel (e.g., distance, direction, speed, etc.) relative to the body portion.

Known tethered fasteners are often assembled into a space having a limited size. This means that the tethered fastener must be wrapped, folded, or otherwise assembled in a way that reduces the overall size or footprint of the tethered fastener. It would be desirable to provide a new fastener design that improves the ability to assemble a tethered fastener into a space having a limited size.

SUMMARY

This section provides a general summary of the disclosure, and is not a comprehensive disclosure of its full scope or all of its features.

In accordance with a first aspect of the present disclosure, a tethered fastener includes a first connector portion, a second connector portion, and a tether portion. The tether portion couples the first connector portion to the second connector portion and includes a first releasable holding feature, a first cooperating releasable holding feature, a second releasable holding feature, and a second cooperating releasable holding feature. The first releasable holding feature is engageable with the first cooperating releasable holding feature. The second releasable holding feature is engageable with a second cooperating releasable holding feature. The first releasable holding feature engages the first cooperating releasable holding feature, and the second releasable holding feature engages the second cooperating releasable holding feature, to retain the tether portion in a folded configuration.

In some configurations, the second connector portion has an elongated rectangular shape having a pair of short ends and a pair of elongated sides. The second connector portion is joined to the tether portion at a short end, and the tether portion includes at least one arm extending along and adjacent the pair of elongated sides.

In some configurations, the at least one arm comprises a pair of arms. Each arm extends beside one of the pair of elongated sides of the second connector portion.

In some configurations, each of the arms includes an I-beam shaped cross section.

In some configurations, the first releasable holding feature includes a narrowed portion of the pair of arms. The first cooperating releasable holding feature includes a pair of protrusions operable to engage the narrowed portion of the pair of arms.

In some configurations, at least one rib member extends from and between the at least one arm and the second connector portion.

In some configurations, the at least one arm comprises a pair of arms. Each arm extends beside one of the pair of elongated sides of the second connector portion. The at least one rib member includes a first rib member extending from and between one of the pair of elongated sides and a first of the at least one arm. A second rib member extends from and between another of the pair of elongated sides and a second of the at least one arm.

In some configurations, the tether portion further includes a pair of beams extending in a first direction. The pair of beams define a window therebetween.

In some configurations, each of the beams comprises an I-beam shaped cross section.

In some configurations, the first and second releasable holding features extend from and between the pair of arms.

In some configurations, the first cooperating releasable holding feature includes a pair of tangs operable to pinch the first releasable holding feature therebetween. The second cooperating releasable holding feature includes a hook operable to engage the second releasable holding feature.

In some configurations, the tether portion includes a first lateral edge, a second lateral edge, and a web portion extending from and between the first and second lateral edges. The first lateral edge includes a first flange portion, and the second lateral edge includes a second flange portion.

In some configurations, the web portion and the first and second flange portions define an I-beam shaped cross section.

In accordance with another aspect of the present disclosure, a tethered fastener assembly includes a first connector, a tether, and a second connector. The tether includes a proximal end and a distal end. The distal end of the tether is coupled to the first connector. The second connector includes a proximal end and a distal end. The proximal end of the second connector is coupled to the proximal end of the tether. The distal end of the second connector is disposed between the proximal and distal ends of the tether.

In accordance with a further aspect of the present disclosure, a tethered fastener assembly includes a first connector portion, a second connector portion, and a tether portion. The tether portion couples the first connector portion to the second connector portion. The tether portion includes a pair of arms, a first beam member, second beam member, a pair of tangs, and a hook member. The first beam member extends from and between the pair of arms. The second beam member extends from and between the pair of arms. The pair of tangs is operable to releasably engage the first beam member. The hook member is operable to releasably engage the second beam member.

In accordance with yet another aspect of the present disclosure a tethered fastener assembly includes a first connector portion, a second connector portion, and a tether portion. The tether portion couples the first connector portion to the second connector portion. The tether portion includes a proximal portion, a central portion, and a distal portion. The proximal portion includes a pair of arms. The central portion includes an aperture. The distal portion includes a pair of tangs and a hook member. The pair of tangs extend from opposed lateral edges of the tether portion and are operable to releasably engage the pair of arms. The hook member is operable to releasably engage the aperture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
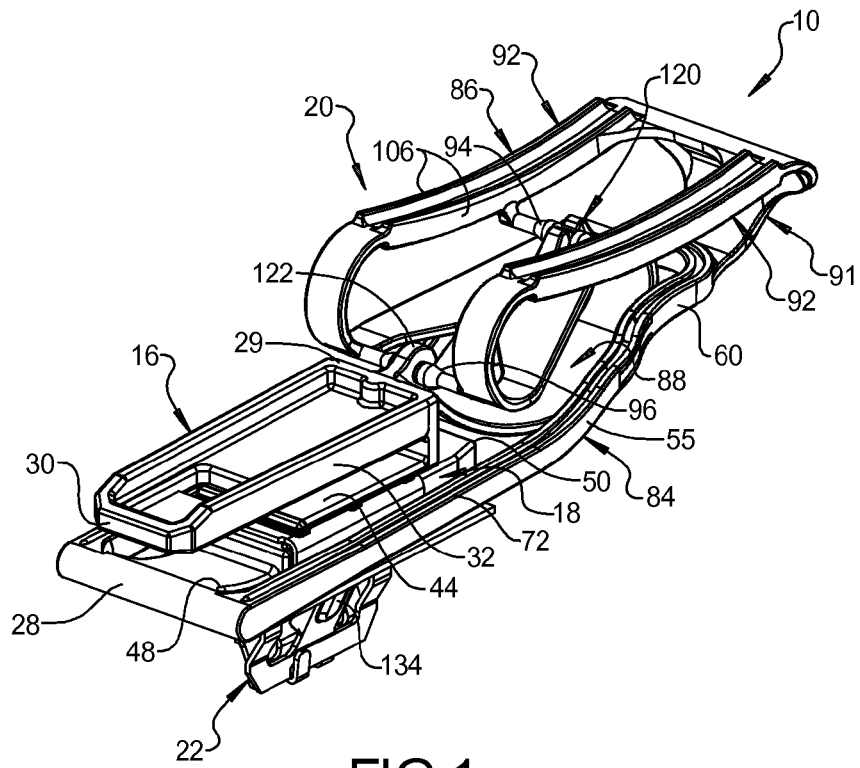
FIG. 1 is a perspective view of a tethered fastener in an assembled configuration in accordance with the principles of the present disclosure.
Figure 2:
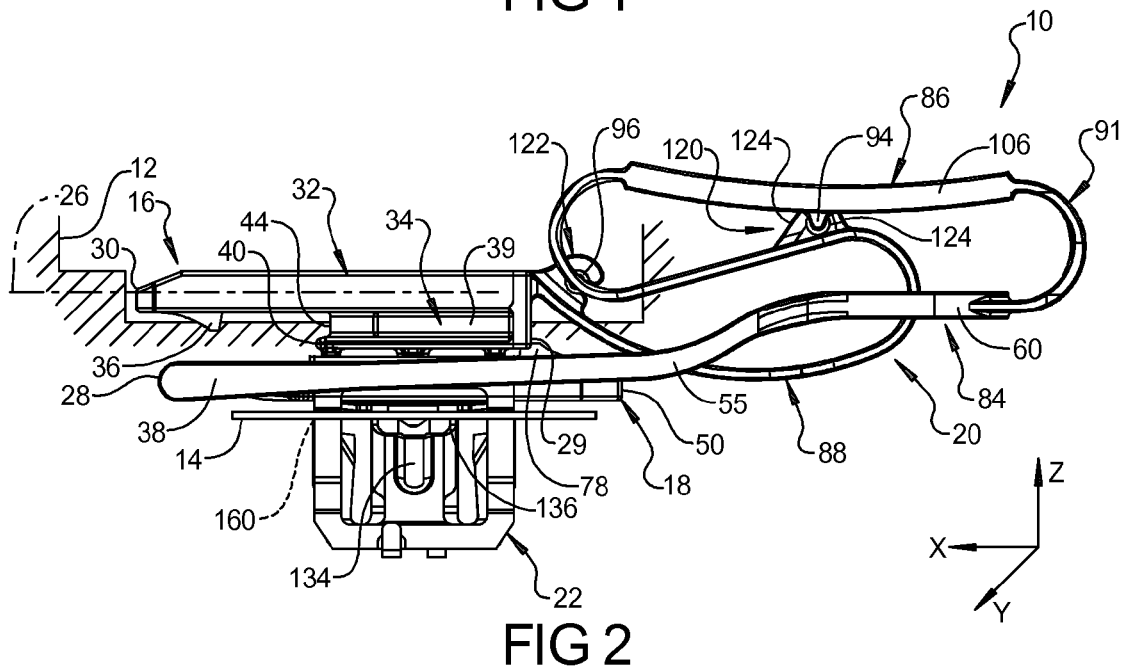
FIG. 2 is a side elevation view of the tethered fastener of FIG. 1 when joining components parts of a vehicle.

With initial reference to FIGS. 1-4, a tethered fastener assembly constructed in accordance with the present disclosure is illustrated and identified at reference character 10. As illustrated in FIG. 2, the tethered fastener assembly 10 may be used in an automobile (not shown) or other similar vehicle to join a first component 12 to a second component 14. According to one exemplary use, the first component 12 is a trim panel, and the second component 14 is a body portion of the automobile. It will be appreciated, however, that the present teachings may be adapted to join various components in the automobile.

The tethered fastener assembly 10 includes a first connector portion 16, a second connector portion 18, a tether portion 20, and a clip 22. The tethered fastener assembly 10 includes a proximal end 28 and a distal end 30. The first connector portion 16 extends longitudinally along an axis 26 from a proximal end 29 to the distal end 30. For the sake of clarity, the axis 26 will be described herein as extending in the X-direction. As explained above, and will be explained in more detail below, the proximal end 29 is coupled to the tether portion 20. While the tethered fastener assembly 10 is described as including first and second connector portions 16, 18 and a tether portion 20, it will be appreciated that the tethered fastener assembly 10 can be integrally formed, such that the first and second connector portions 16, 18 and the tether portion 20 are a monolithic construct. In this regard, the tethered fastener assembly 10 can be made from nylon 12, Hytrel®, nylon 6-6, or another suitable material, by an injection molding process, for example.

The first connector portion 16 includes a base portion 32 and a body portion 34. The base portion 32 extends from and between the proximal and distal ends 29, 30 and includes a projection or lock portion 36. The lock portion 36 is located near the distal end 30 and extends from a first or lower surface 38 (relative to the view in FIG. 2) of the base portion 32 in a direction substantially perpendicular to the axis 26. In an assembled configuration, the lock portion 36 may lock or otherwise secure the first connector 16 to the first component 12. In this regard, the first lock portion 36 may lock the first connector 16 to, or within, a doghouse portion (not shown) of the first component 12, as illustrated in FIG. 2.

The body portion 34 can be integrally and monolithically formed with the base portion 32 and can include a base 39, a flange or lip 40, and a post or stem 42. The base 39 extends from the proximal end 29 along the axis 26, and further extends from the lower surface 38 of the base portion 32 in a direction substantially perpendicular to the axis 26. The lip 40 is formed around the periphery of the base 39, such that the lip 40 and the base portion 32 define a channel 44 therebetween. The stem 42 extends from a first or lower surface 46 (relative to the view in FIG. 2) of the base 39 in a direction substantially perpendicular to the axis 26.

The second connector portion 18 extends from the proximal end 28 of the tethered fastener assembly 10 to a distal end 50 in a direction substantially parallel to the axis 26. The second connector portion 18 includes an elongated rectangular shape having a pair of elongated sides 52, 54 extending from and between the proximal end 28 and the distal end 50. In this regard, proximal and distal ends 28, 50 are shorter than the elongated sides 52, 54.

The second connector portion 18 includes a stop portion 74, a fastening portion 76, and a catch portion 78. The stop portion 74 may include a peripheral flange projecting outwardly from the second connector portion 18. The stop portion 74 is located between the base portion 52 and the fastening portion 76. The fastening portion 76 may include an elongated aperture located between the stop portion 74 and the catch portion 78. The catch portion 78 extends from the second connector portion 18 in a direction substantially perpendicular to the axis 26. In this regard, the catch portion 78 can be aligned with an aperture 80 in the second connector portion 18, such that the catch portion 78 can flex or otherwise bend relative to the second connector portion 18 within the aperture 80.

Figure 3:
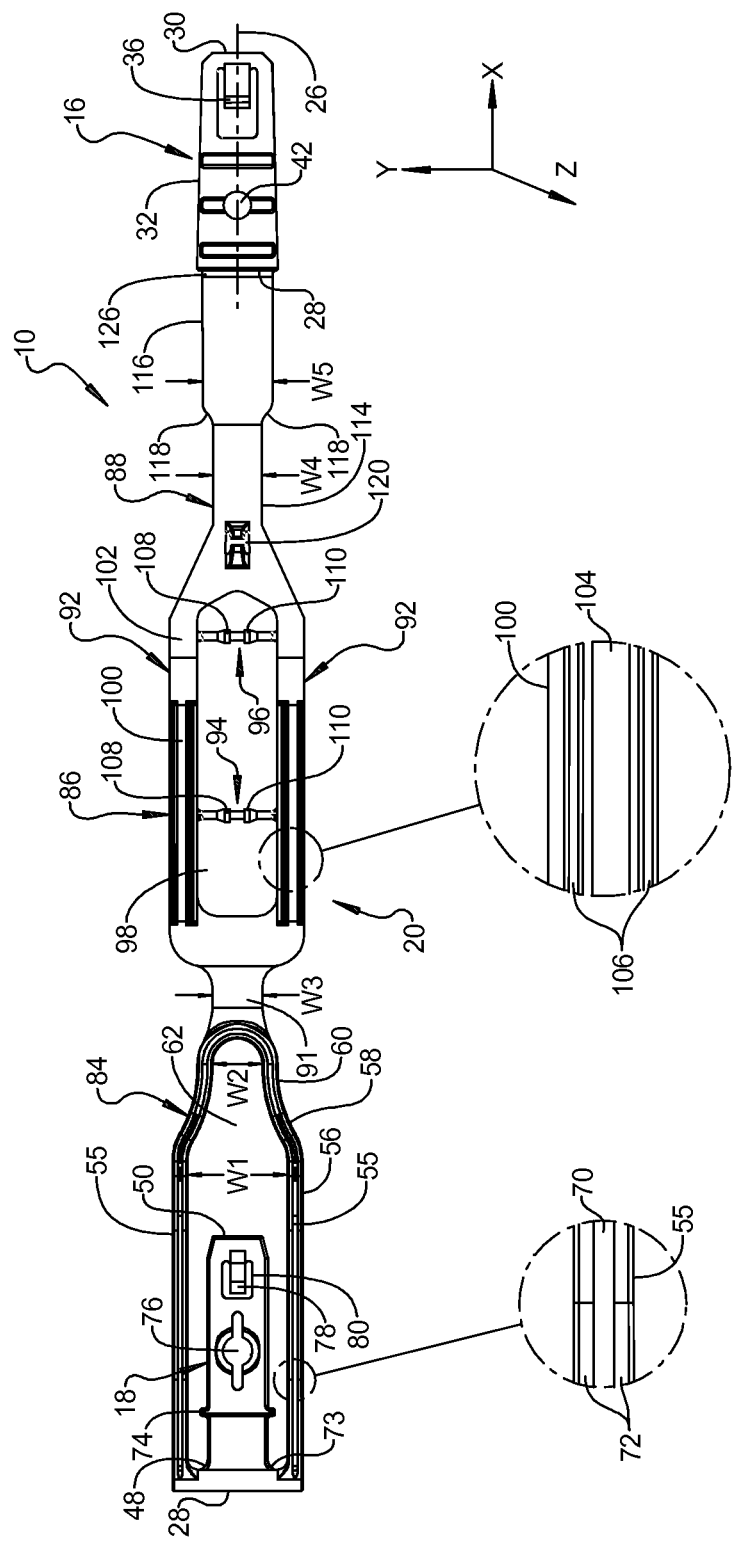
FIG. 3 is a top side view of the tethered fastener of FIG. 1 in a disassembled configuration.
Figure 4:
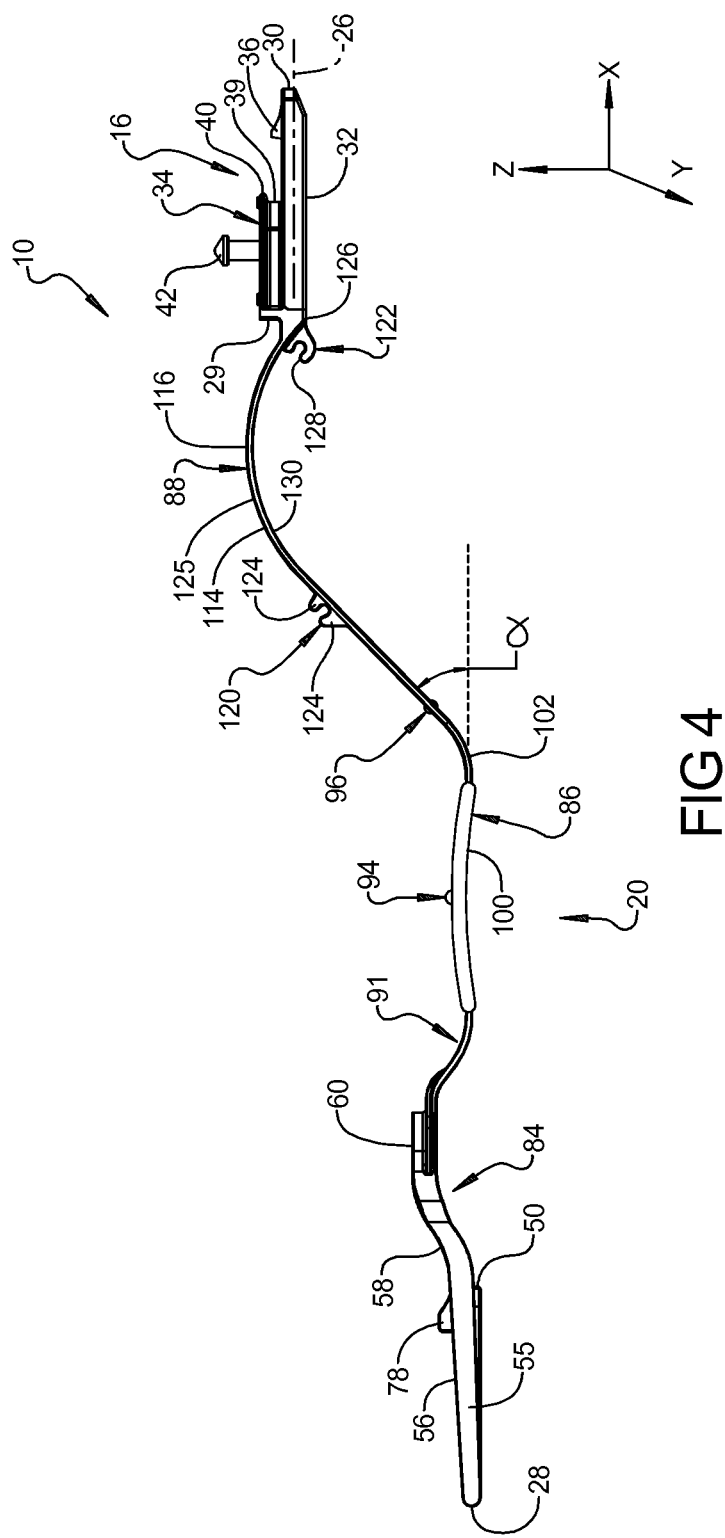
FIG. 4 is a side view of the tethered fastener of FIG. 1 in a disassembled configuration.
Figure 5:
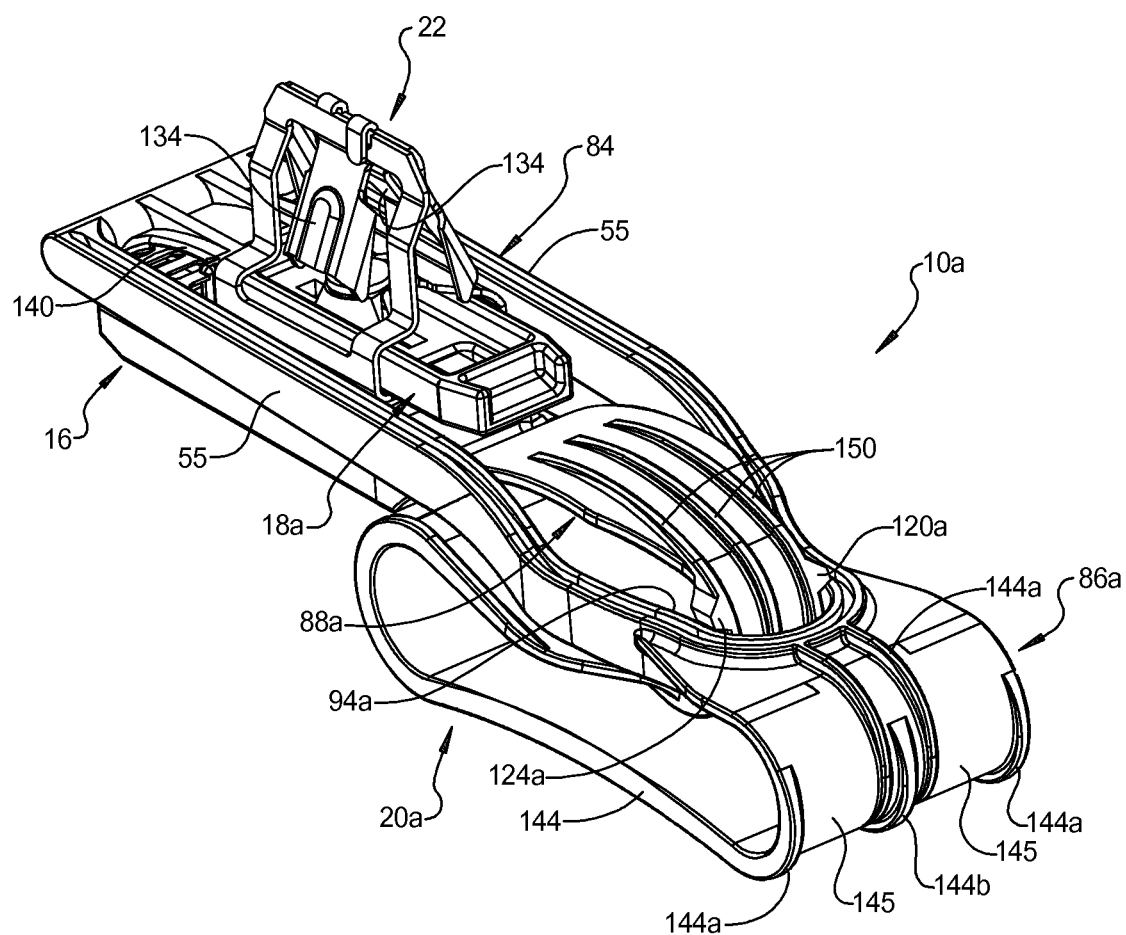
FIG. 5 is a perspective view of another tethered fastener in an assembled configuration in accordance with the principles of the present disclosure.
Figure 6:
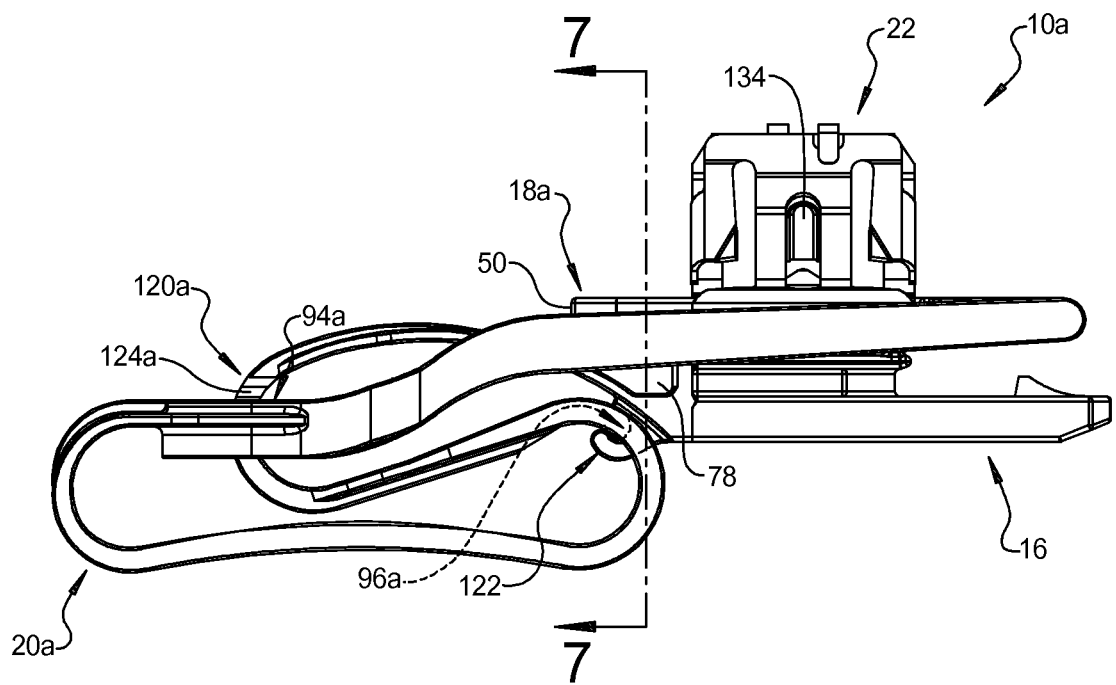
FIG. 6 is a side elevation view of the tethered fastener of FIG. 5.

The tether portion 20 extends from and between the proximal end 28 and the first connector 16, such that the tether portion 20 couples or otherwise connects the first connector portion 16 to the second connector portion 18. In this regard, the tether portion 20 can be integrally and monolithically formed with the first and second connectors 16, 18. With reference to FIGS. 3 and 4, the tether portion 20 includes a first or proximal portion 84, a second or central portion 86, and a third or distal portion 88. The proximal portion 84 extends from and between the second connector portion 18 and the central portion 86. The central portion 86 extends from and between the proximal portion 84 and the distal portion 88. The distal portion 88 extends from and between the central portion 86 and the proximal end 29 of the first connector portion 16.

The proximal portion 84 includes a pair of arms 55. Each arm 55 includes a first portion or segment 56, a second portion or segment 58, and a third portion or segment 60. The first segment 56 extends in a direction substantially parallel to the axis 26, such that the first segment 56 of the pair of arms 55 defines a plane that is substantially parallel to the X-Y plane. The second segment 58 extends from, and is integrally formed with, the first segment 56. As illustrated in FIGS. 3 and 4, the second segment 58 extends from the first segment 56 in both the Y- and Z-directions. The third segment 60 extends from, and is integrally formed with, the second segment 58. The third segment 60 extends from the second segment 58 in a direction substantially parallel to the axis 26, such that the third segments 60 of the pair of arms 55 define a plane that is substantially parallel to the X-Y plane. In this regard, as illustrated in FIG. 3, the first, second and third segments 56, 58, 60 can define a substantially bottle-shaped window or aperture 62, having a first width W1 between the first segments 56, and a second width W2, that is less than the first width W1, between the second segments 58 and/or the third segments 60.

As illustrated in FIG. 3, at least one of the first, second and third segments 56, 58, 60 includes an I-beam shaped cross-section, including a web portion 70 in the X-Y plane, and a pair of opposing flange portions 72 in the X-Z plane. In some configurations, the first, second and third segments 56, 58, 60 include the web portion 70 and the flange portions 72. As will be explained in more detail below, the I-beam configuration of the first, second and/or third segments 56, 58, 60 can help to provide flexibility to the second connector portion 18 in the X-Z plane, and rigidity to the second connector portion 18 in the X-Y plane.

The second connector portion 18 is located between the arms 55 and within the aperture 62. In this regard, the proximal end 48 of the second connector portion 18 is coupled to the proximal end 28 of the tethered fastener assembly 10, and the distal end 50 of the second connector portion 18 is located within the aperture 62, such that the second connector portion 18 extends toward central portion 86 of the tether portion 20 from the proximal end 48 to the distal end 50. More specifically, at least one of the arms 55 extends along and adjacent the elongated sides 52, 54 of the second connector portion 18. In some configurations, each of the arms 55 extends beside one of the elongated sides 52, 54. As will be described in more detail below, in this way the second connector portion 18 can flex or otherwise bend to increase the length of the assembly 10 (as measured along the axis 26) during an airbag deployment event.

With reference to FIGS. 3 and 4, the central portion 86 of the tether portion 20 includes a single strap portion 91, a pair of beams or arms 92, a first lock feature 94, and a second lock feature 96. As illustrated in FIG. 4, in some configurations, the single strap portion 91 includes a curvilinear shape or profile in the X-Z plane. The single strap portion 91 can define a third width W3 in the X-Y plane (FIG. 3). As will be explained in more detail below, the curvilinear shape of the single strap portion 91 can provide a bending location when the assembly 10 is in the assembled configuration (FIGS. 1 and 2). In this regard, the curvilinear shape of the single strap portion 91 can improve the process of assembling, or otherwise folding, the assembly 10. It will also be appreciated, however, that the single strap portion 91 can include a generally planar shape or profile in the X-Z plane, within the scope of the present disclosure.

The pair of arms 92 includes a curvilinear shape or profile in the X-Z plane, and extends from the single strap portion 91 to the distal portion 88. The pair of arms 92 defines a window or void 98 therebetween (FIG. 3). Each of the arms 92 includes a proximal end portion 100 and a distal end portion 102. The proximal end portion 100 of the arm 92 includes an I-beam shaped cross section, including a web portion 104 in the X-Y plane, and a pair of opposing flange portions 106 extending from the web portion 104 in the X-Y plane. As will be explained in more detail below, the I-beam configuration of the proximal end portion 100 can help to provide flexibility to the central portion 86 of the tether portion 20 in the X-Z plane, and rigidity to the central portion 86 in the X-Y plane. As illustrated in FIG. 4, the distal end portion 102 of the arm 92 extends from the proximal end portion 100 at an angle α relative to the X axis. The angle α can be between ten degrees and sixty degrees. In some configurations, the angle α is substantially equal to forty-five degrees. The angle α can improve the process of assembling, or otherwise folding, the assembly 10.

The first and second lock features 94, 96 can each include a frangible rib or beam extending from and between the pair of arms 92. In this regard, the first and second lock features 94, 96 may be referred to herein as first and second rib members and/or beam members 94, 96. As illustrated in FIG. 3, the first and second lock features 94, 96 can extend across the void 98. The first lock feature 94 can be aligned with the proximal end portion 100 of the arms 92, and the second lock feature 96 can be aligned with the distal end portion 102 of the arms 92. The first lock feature 94 may be substantially similar to the second lock feature 96 apart from any exceptions described below and/or shown in the Figures. Therefore, references herein to the first lock feature 94 will be understood to apply equally to the second lock feature 96, and like reference numerals may be used to describe like features and components. In this regard, the first and second lock features 94, 96 may also be referred to herein as first and second releasable holding features 94, 96. The first lock feature 94 can include a first flange or stop portion 108 and a second flange or stop portion 110. The first and second stop portions 108, 110 project radially outwardly from the first lock feature 94. As will be explained in more detail below, the pair of arms 92 and the first and second stop portions 108, 110 can help to secure the assembly 10 in the assembled configuration.

With reference to FIG. 3, the distal portion 88 of the tether portion 20 includes a proximal end portion 114 defining a fourth width W4 in the X-Y plane, and a distal end portion 116 defining a fifth width W5 (greater than the fourth width W4) in the X-Y plane. In this regard, the distal portion 88 may further include opposed tapered sidewalls 118 extending from the fourth width W4 of the proximal end portion 114 to the fifth width W5 of the distal end portion 116. As illustrated in FIG. 4, the distal portion 88 can further define or otherwise include a curvilinear shape or profile in the X-Z plane. As will be explained in more detail below, the curvilinear shape of the distal portion 88 can improve the process of assembling, or otherwise folding, the assembly 10. It will also be appreciated, however, that the distal portion 88 can include a generally planar shape or profile in the X-Z plane, within the scope of the present disclosure.

The distal portion 88 further includes a third lock feature 120 and a fourth lock feature 122. The third lock feature 120 may be aligned with the proximal end portion 114, and can include opposed tangs 124. The tangs 124 can generally project or otherwise extend from a first side 125 of the tether portion 20. The fourth lock feature 122 may be located proximate to a distal end 126 of the tether portion 20. In this regard, the fourth lock feature 122 may be located proximate to the proximal end 29 of the first connector portion 16. The fourth lock feature 122 includes a hook member 128. With reference to FIG. 4, the hook member 128 can generally project or otherwise extend from a second side 130 of the tether, opposite the first side 125. As will be explained in more detail below, the third and fourth lock features 120, 122 can cooperate with the first and second lock features 94, 96 to secure the assembly 10 in the assembled configuration. In this regard, the third and fourth lock features 120, 122 may be referred to herein as first and second cooperating releasable holding features 120, 122.

The clip 22 may be coupled to or otherwise supported by the second connector portion 18. With reference to FIGS. 2 and 3, the clip 22 can be coupled to the second connector portion 18, such that the clip 22 is located between the stop portion 74 and the catch portion 78. The clip 22 may include a pair of opposed outwardly projecting arms 134. The clip 22 may be formed from a resilient or flexible material, such that the arms 134 can be biased relative to the clip 22. In this regard, the clip 22 may be formed from a metallic material, such as spring steel or a steel alloy, for example. As illustrated in FIG. 2, the arm 134 includes a stop surface 136 at the distal end thereof. As will be explained in more detail below, in an assembled configuration, the stop surface 136 abuts the second component 14 to secure the clip 22 and the second connector 18 to the second component. A further discussion of the clip 22, including various configurations and functions thereof, may be found in commonly owned U.S. Pat. No. 7,454,826, entitled "Method of Manufacturing Multiple Engagement Joint Tethered Fastener," which is hereby incorporated by reference in its entirety.

With reference to FIG. 2, in the assembled configuration, the clip 22 can be coupled to the second connector portion 18 and to the second component 14, or body portion, of the automobile, and the first connector portion 16 can be coupled to the first component 12, or trim panel portion, of the automobile. As illustrated, in the assembled configuration, the distal end 30 of the first connector portion 16 is substantially aligned with the proximal end 48 of the second connector portion 18.

To secure the tethered fastener assembly 10 in the assembled configuration, the stem 42 of the first connector portion 16 can be coupled to the fastening portion 76 of the second connector portion 18, the first lock feature 94 can be coupled to the third lock feature 120, and the second lock feature 96 can be coupled to the fourth lock feature 122, as indicated above. In this regard, the third and fourth lock features 120, 122 can be located between the first and second stop portions 108, 110 of the first and second lock features 94, 96, respectively, in the assembled configuration. The tangs 124 of the third lock feature 120 can pinch or otherwise squeeze the first lock feature 94 in a snap-fit configuration. As illustrated in FIG. 2, in the assembled configuration, the distal portion 88 of the tether portion 20 may be disposed between the arms 55 of the proximal portion 84 of the tether portion 20, such that the assembly 10 is compact, or its size is otherwise small, in the assembled configuration. In this regard, at least a portion of the assembly 10 may define an S-shape in the assembled configuration.

During a deployment of the airbag or other supplemental restraint system, the stem 42 of the first connector portion 16 can decouple or otherwise disengage from the fastening portion 76 of the second connector portion 18, and the first and second lock features 94, 96 can release or otherwise disengage from the third and fourth lock features 120, 122, such that the tethered fastener assembly 10 flexes or bends to assume the configuration illustrated in FIGS. 3 and 4. In this regard, the second connector portion 18 may flex relative to the proximal portion 84 of the tether portion 20, such that the proximal end 28 of the tethered fastener assembly 10 is located between the distal end 50 of the second connector portion 18 and the distal end 30 of the tethered fastener assembly 10. In other words, the distance between distal ends 30, 50 of the tethered fastener assembly 10 and the second connector portion 18, respectively, can be greater than the distance between proximal and distal ends 28, 30 of the tethered fastener assembly 10. The arms 134 of the clip 22 may secure the clip 22 to the second component 14, and the lock portion 58 of the second connector 18 may secure the clip 22 to the second connector 18.

During another method of deployment, the first and second lock features 94, 96 may tear or otherwise separate from the tether portion 20, thereby absorbing energy, while allowing the assembly 10 to assume the disassembled configuration illustrated in FIGS. 3 and 4. In the disassembled configuration, the second component 14 can disengage and move away from the first component 12, such that the tether portion 20 can control the movement (e.g., distance and direction of travel, velocity, acceleration, etc.) of the first component 12 relative to the second component 14 during deployment of the airbag. By controlling the movement of the first component 12, the tethered fastener assembly 10 can help to reduce the stress and strain imparted on both the first and second components 12, 14.

With reference to FIGS. 5 through 9, another tethered fastener assembly 10a is shown. The structure and function of the tethered fastener assembly 10a may be substantially similar to that of the tethered fastener assembly 10 illustrated in FIGS. 1 through 4, apart from any exceptions described below and/or shown in the Figures. Therefore, the structure and/or function of similar features will not be described again in detail. In addition, like reference numerals are used hereinafter and in the drawings to identify like components, while like reference numerals containing letter extensions are used to identify those components that have been modified.

Figure 8:
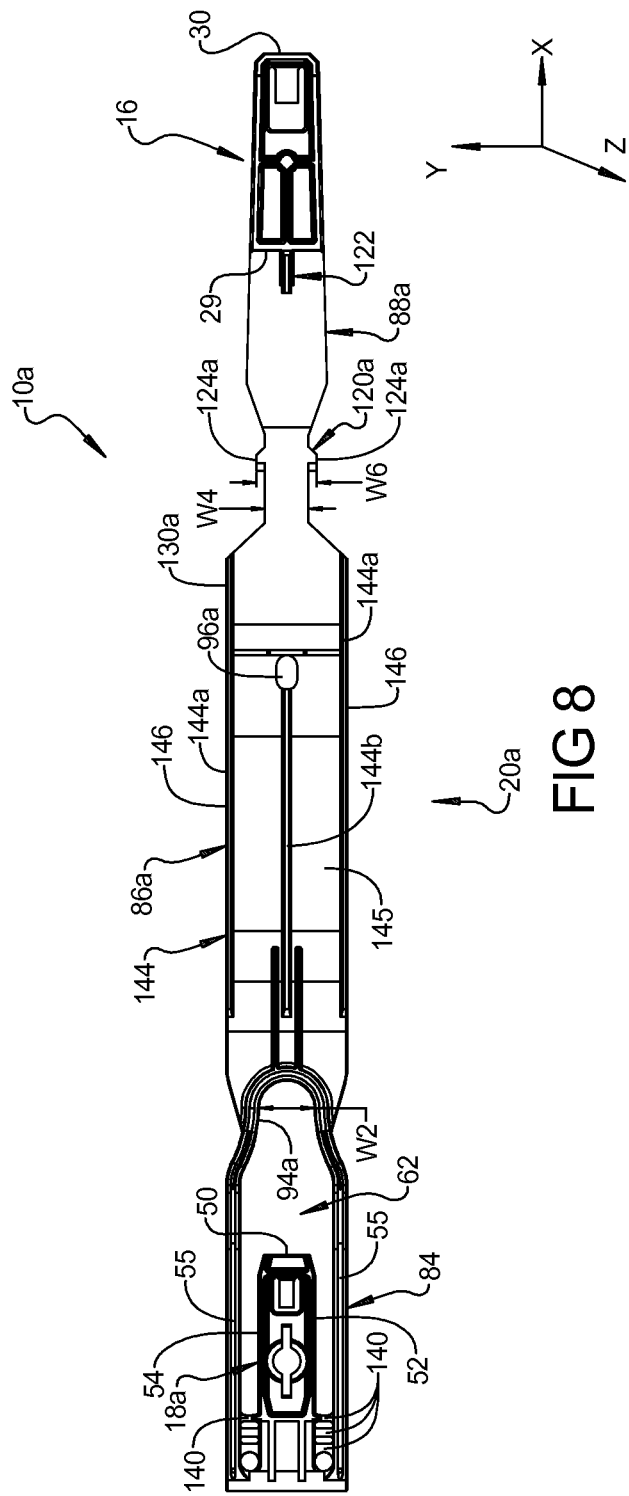
FIG. 8 is a top side view of the tethered fastener of FIG. 5 in a disassembled configuration.
Figure 9:
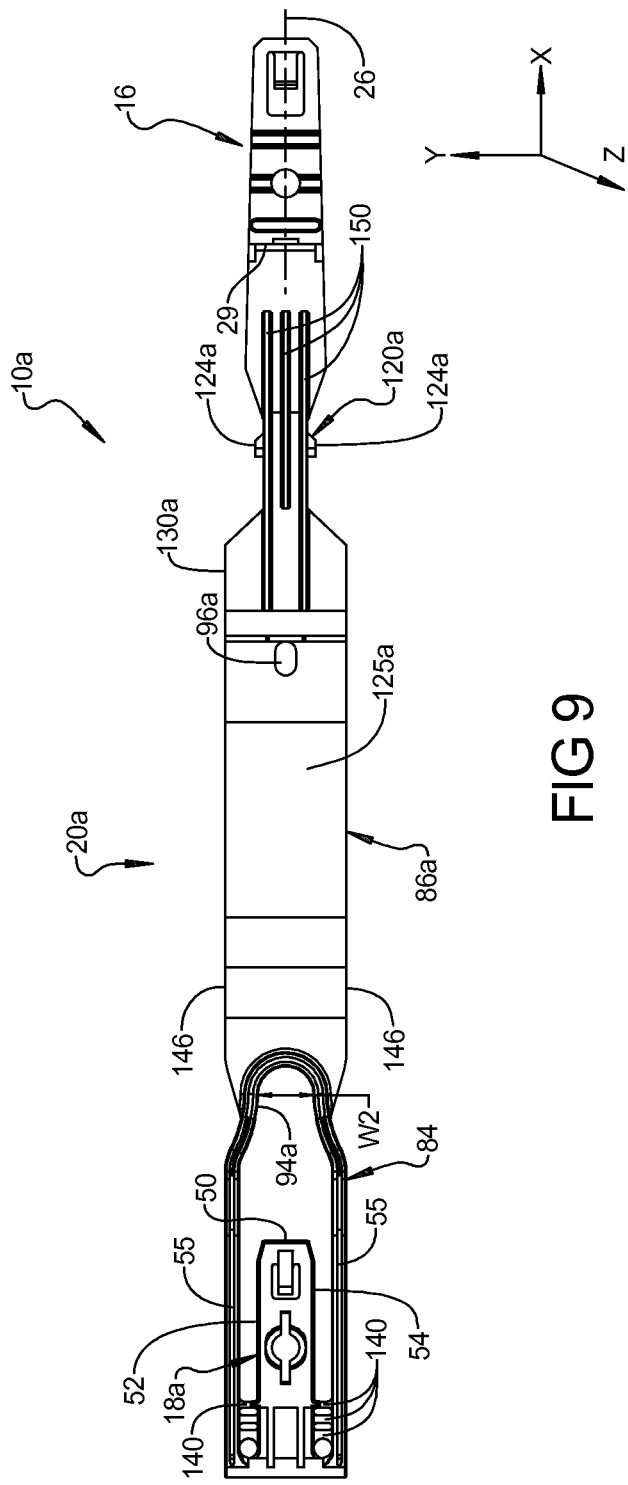
FIG. 9 is a bottom side view of the tethered fastener of FIG. 5 in a disassembled configuration.

The tethered fastener assembly 10a includes the first connector portion 16, a second connector portion 18a, a tether portion 20a, and the clip 22. The second connector portion 18a includes a plurality of web features or ribs 140 extending from and between the second connector portion 18a and the pair of arms 55. In some configurations, at least one rib 140 extends from and between one of the pair of elongated sides 52, 54 and a first of the arms 55, and at least one rib 140 extends from and between another of the pair or elongated sides 52, 54 and a second of the arms 55. As illustrated in FIGS. 8 and 9, in some configurations, the second connector portion 18a can include three ribs 140 connecting the second connector portion 18a to the first arm of the pair of arms 55, and three ribs 140 connecting the second connector portion 18a to the second arm of the pair of arms 55. It will be appreciated, however, that the second connector portion 18a may include more or less than six ribs 140 within the scope of the present disclosure. As will be explained in more detail below, the ribs 140 may help to control the movement of the first component 12 relative to the second component 14 during deployment of the airbag.

The tether portion 20a includes the proximal portion 84, a central portion 86a, and a distal portion 88a. With reference to FIG. 9, the aperture 62 of the proximal portion 84 includes a first lock feature 94a aligned with the second width W2. In this regard, the first lock feature 94a can include, or otherwise be at least partially defined by, the pair of arms 55 of the proximal portion 84. The central portion 86a includes a second lock feature 96a, a plurality of flanges or fin features 144, and a web portion 145. The second lock feature 96a can define an aperture in the central portion 86a.

Figure 7:
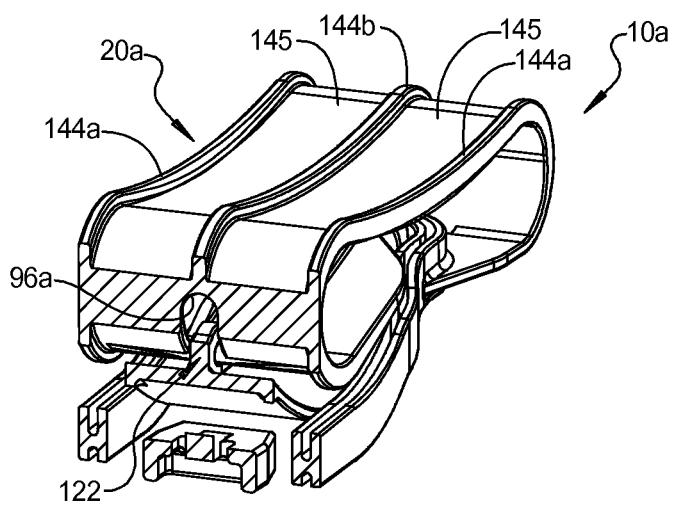
FIG. 7 is a cross-sectional view of the tethered fastener of FIG. 6, taken through the line 7-7.

In some configurations, the central portion 86a includes lateral fin features 144a extending along opposed lateral edges 146 of the central portion 86a, and central fin features 144b extending between, and substantially parallel to, the lateral fin features 144a. The web portion 145 of the central portion 86a extends from and between the lateral fin features 144a. As illustrated in FIG. 7, the central portion 86a, including the web portion 145 and the lateral fin features 144a, can define an I-beam shaped cross section. The I-beam configuration can help to provide flexibility to the central portion 86a of the tether portion 20 in the X-Z plane, and rigidity to the central portion 86a in the X-Y plane.

With reference to FIGS. 8 and 9, the distal portion 88a of the tether portion 20a includes a third lock feature 120a, the fourth lock feature 122, and a plurality of fins or ribs 150. The third lock feature 120a includes opposed protrusions or tangs 124a. In this regard, the third lock feature 120a may be aligned with the fourth width W4 of the distal portion 88a. The tangs 124a can generally project or otherwise extend from the lateral edges 146 of the tether portion 20a, such that the tangs 124a define a sixth width W6 that is greater than the second and fourth widths W2, W4. The ribs 150 are disposed on a first side 125a of the tether portion 20a.

In the assembled configuration, the first lock feature 94a can be coupled to the third lock feature 120a (FIG. 5), and the second lock feature 96a can be coupled to the fourth lock feature 122 (FIG. 7). In this regard, the tangs 124a of the third lock feature 120a can be located between the pair of arms 55 of the tether portion 20a, such that the sixth width W6 of the tangs 124a can secure the third lock feature 120a within the second width W2 of the pair of arms 55. The fourth lock feature 122 can be disposed within or otherwise hooked to the second lock feature 96a.

As illustrated in FIG. 2, the first connector 16 can be coupled to the first component 12, or trim panel portion, of the automobile. In this regard, the first connector 16 may be referred to as a trim panel connector 16 herein. The second connector 18, including the clip 22, can be coupled to the second component 14, or body portion, of the automobile. In this regard, the second connector 18 may be referred to as a body connector 18 herein. The clip 22 may be positioned in an aperture 160 of the second component 14, such that the arms 134 are located on a first side 162 of the second component 14, and the second connector 18 is located on a second side 164 of the second component 14. In this regard, the stop surface 136 may abut the first side 162 of the second component 14 to retain the clip 22 within the aperture 160.

During a deployment of the airbag or other supplemental restraint system, the first lock feature 94a can decouple or otherwise disengage from the third lock feature 120a, and the fourth lock feature 122 can disengage from the second lock feature 96a, such that the tethered fastener assembly 10a assumes the configuration illustrated in FIG. 8. In the disassembled configuration, the second component 14 can disengage and move away from the first component 12, such that the tether portion 20a can control the movement (e.g., distance and direction of travel, velocity, acceleration, etc.) of the first component 12 relative to the second component 14 during deployment of the airbag. In this regard, as the first component 12 moves away from the second component 14, the ribs 140 may tear or otherwise separate from the second connector portion 18 and/or the second arm of the pair of arms 55, thereby absorbing energy and slowing, and/or otherwise controlling, the movement of the first component 12 relative to the second component 14.

Example embodiments are provided so that this disclosure will be thorough, and will fully convey the scope to those who are skilled in the art. Numerous specific details are set forth such as examples of specific components, devices, and methods to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only, and is not intended to be limiting. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, can be combined with any combination of features of other embodiments, even if not specifically shown or described. The same may also be varied in many ways. Such variations are not to be regarded as a departure from the disclosure, and all such modifications are intended to be included within the scope of the disclosure.

What is claimed is:

1. A tethered fastener assembly, comprising:
    a first connector portion;
    a second connector portion; and
    a tether portion coupling the first connector portion to the second connector portion, the tether portion including:
        a first releasable holding feature engageable with a first cooperating releasable holding feature, a second releasable holding feature engageable with a second cooperating releasable holding feature;
    wherein the first releasable holding feature and the first cooperating releasable holding feature engage each other, and the second releasable holding feature and the second cooperating releasable holding feature engage each other to releasably retain the tether portion in a folded configuration.

2. The tethered fastener assembly of claim 1, wherein the second connector portion has an elongated rectangular shape having a pair of short ends and a pair of elongated sides, and the second connector portion is joined to the tether portion at a short end, and wherein the tether portion includes at least one arm extending along and adjacent the pair of elongated sides.

3. The tethered fastener assembly of claim 2, wherein the at least one arm comprises a pair of arms, with each arm extending beside one of the pair of elongated sides of the second connector portion.

4. The tethered fastener assembly of claim 3, wherein each of the arms includes an I-beam shaped cross section.

5. The tethered fastener assembly of claim 3, wherein the first releasable holding feature comprises a narrowed portion of the pair of arms, and the first cooperating releasable holding feature comprises a pair of protrusions operable to engage the narrowed portion of the pair of arms.

6. The tethered fastener assembly of claim 2, further comprising at least one rib member extending from and between the at least one arm and the second connector portion.

7. The tethered fastener assembly of claim 6, wherein the at least one arm comprises a pair of arms, with each arm extending beside one of the pair of elongated sides of the second connector portion, and wherein the at least one rib member includes a first frangible rib member extending from and between one of the pair of elongated sides and a first of the at least one arm, and a second frangible rib member extending from and between another of the pair or elongated sides and a second of the at least one arm.

8. The tethered fastener assembly of claim 1, wherein the tether portion further includes a pair of beams extending in a first direction, the pair of beams defining a window therebetween.

9. The tethered fastener assembly of claim 8, wherein each of the beams comprises an I-beam shaped cross section.

10. The tethered fastener assembly of claim 8, wherein the first and second releasable holding features extend from and between the pair of arms.

11. The tethered fastener assembly of claim 10, wherein the first cooperating releasable holding feature includes a pair of tangs operable to pinch the first releasable holding feature therebetween, and the second cooperating releasable holding feature includes a hook operable to engage the second releasable holding feature.

12. The tethered fastener assembly of claim 1, wherein the tether portion includes a first lateral edge, a second lateral edge, and a web portion extending from and between the first and second lateral edges, the first lateral edge including a first flange portion, and the second lateral edge including a second flange portion.

13. The tethered fastener assembly of claim 12, wherein the web portion and the first and second flange portions define an I-beam shaped cross section.

14. The tethered fastener assembly of claim 1,
wherein the tether portion includes a pair of arms, and the first releasable holding feature comprises a first beam member extending from and between the pair of arms, and the second releasable holding feature comprises a second beam member extending from and between the pair of arms, and the first cooperating releasable holding feature comprises a pair of tangs operable to releasably engage the first beam member, and the second cooperating releasable holding feature comprises a hook member operable to releasably engage the second beam member.

15. The tethered fastener assembly of claim 14, wherein the first beam member includes a first pair of radially outwardly projecting flange portions, and the second beam member includes a second pair of radially outwardly projecting flange portions, and wherein the pair of tangs is releasably secured to the first beam member between the first pair of flange portions, and the hook member is releasably secured to the second beam member between the second pair of flange portions.

16. The tethered fastener assembly of claim 14, wherein each of the pair of arms includes an I-beam shaped cross section.

17. A tethered fastener assembly, comprising:
a first connector;
a tether, including a proximal end and a distal end, the distal end coupled to the first connector;
a second connector, including a proximal end and a distal end, the proximal end of the second connector coupled to the proximal end of the tether, the distal end of the second connector disposed between the proximal and distal ends of the tether;
wherein the tether includes a first releasable holding feature engageable with a first cooperating releasable holding feature, and a second releasable holding feature engageable with a second cooperating releasable holding feature, and wherein the first and second releasable holding features and the first and second cooperating releasable holding features engage each other to retain the tether portion in a folded configuration.

18. The tethered fastener assembly of claim 17, wherein the second connector has an elongated rectangular shape having a pair of short ends and a pair of elongated sides, and the second connector is joined to the tether at a short end, and wherein the tether includes at least one arm extending along and adjacent the pair of elongated sides.

19. The tethered fastener assembly of claim 18, further comprising at least one rib member extending from and between the at least one arm and the second connector.

20. The tethered fastener assembly of claim 17, wherein the at least one arm comprises a pair of arms, with each arm extending beside one of the pair of elongated sides of the second connector portion.

21. The tethered fastener assembly of claim 20, wherein each of the arms includes an I-beam shaped cross section.

22. A tethered fastener assembly, comprising:
a first connector portion;
a second connector portion; and
a tether portion coupling the first connector portion to the second connector portion, the tether portion including a proximal portion, a central portion, and a distal portion, the proximal portion including a pair of arms, the central portion including an aperture, the distal portion including a pair of tangs and a hook member, the pair of tangs extending from opposed lateral edges of the tether portion and operable to releasably engage the pair of arms, and the hook member operable to releasably engage the aperture.

23. A tethered fastener assembly of claim 22, wherein the pair of arms includes a first portion having a first width and a second portion having a second width smaller than the first width, and wherein the pair of tangs is operable to engage the second portion of the pair of arms.

24. The tethered fastener assembly of claim 22, further comprising at least one rib member extending from and between at least one of the pair of arms and the second connector portion.

25. The tethered fastener assembly of claim 24, wherein the at least one rib member includes a first rib member and a second rib member, the first rib member extending from and between a first elongated side of the second connector portion and a first of the at least one arm, and the second rib member extending from and between a second elongated side of the second connector portion and a second of the at least one arm.

* * * * *